(12) United States Patent
Thompson et al.

(10) Patent No.: US 10,535,903 B2
(45) Date of Patent: Jan. 14, 2020

(54) BATTERY PACK BUSSING PLATE WITH WELD PROJECTION GEOMETRY AS AN IDENTIFICATION KEY

(71) Applicant: DELL PRODUCTS, LP, Round Rock, TX (US)

(72) Inventors: Rick C. Thompson, Cedar Park, TX (US); Bruce A. Miller, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 671 days.

(21) Appl. No.: 15/051,021

(22) Filed: Feb. 23, 2016

(65) Prior Publication Data
US 2017/0244090 A1 Aug. 24, 2017

(51) Int. Cl.
*H01M 2/20* (2006.01)
*H01M 10/42* (2006.01)

(52) U.S. Cl.
CPC .................. *H01M 10/425* (2013.01)

(58) Field of Classification Search
CPC .... H01M 2/208; H01M 2/202; H01M 10/425; G06F 1/00; H04Q 90/00
See application file for complete search history.

(56) References Cited

U.S. PATENT DOCUMENTS

| 5,565,756 A | 10/1996 | Urbish et al. | |
|---|---|---|---|
| 2002/0102457 A1* | 8/2002 | Oogami | B60L 3/0046 429/159 |
| 2014/0356671 A1* | 12/2014 | Dawley | H01M 2/206 429/90 |

* cited by examiner

*Primary Examiner* — Stephen J Yanchuk
(74) *Attorney, Agent, or Firm* — Larson Newman, LLP (57) ABSTRACT

A battery pack bussing plate, method, and system for providing battery vendor identification capable of surviving a thermal failure event of a battery pack for an information handling system. By receiving a designation of a distinctive current director shape of an extended current director, the extended current director comprising a current director with at least one extension at an angle to a line between a first terminus of the current director and a second terminus of the current director, the distinctive director shape adapted to uniquely identify a battery pack vendor, and transforming sheet metal stock into a battery pack bussing plate, the battery pack bussing plate defining the extended current director, a battery vendor can be identified from a battery pack even after thermal failure of the battery pack.

11 Claims, 7 Drawing Sheets

BATTERY PACK BUSSING PLATE WITH WELD PROJECTION GEOMETRY AS AN IDENTIFICATION KEY

FIELD OF THE DISCLOSURE

The present disclosure generally relates to information handling systems, and more particularly relates to battery pack bussing plates for an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A battery pack bussing plate, method, and system for providing battery vendor identification capable of surviving a thermal failure event of a battery pack for an information handling system. By receiving a designation of a distinctive current director shape of an extended current director, the extended current director comprising a current director with at least one extension at an angle to a line between a first terminus of the current director and a second terminus of the current director, the distinctive director shape adapted to uniquely identify a battery pack vendor, and transforming sheet metal stock into a battery pack bussing plate, the battery pack bussing plate defining the extended current director, a battery vendor can be identified from a battery pack even after thermal failure of the battery pack.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
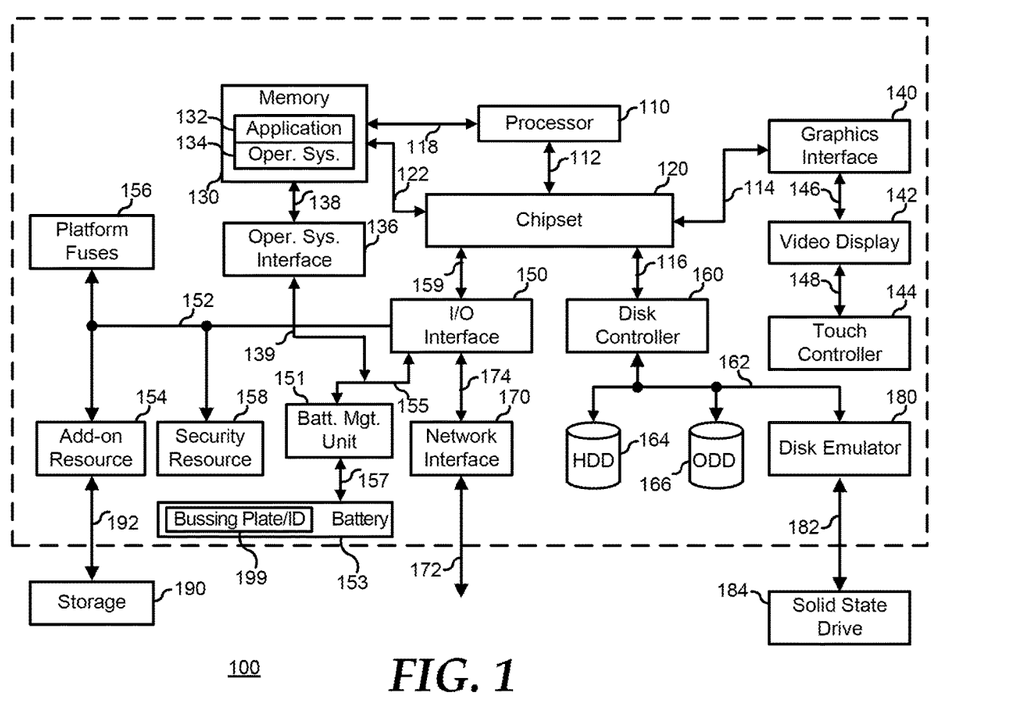
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, include an operating system interface 136, a disk controller 160, a disk emulator 180, an input/output (I/O) interface 150, and a network interface 170. Processor 110 is connected to chipset 120 via processor interface 112. Processor 110 is connected to memory 130 via a memory bus 118. Memory 130 is connected to chipset 120 via a memory bus 122. Memory 130 comprises memory storing an application 132 and memory storing an operating system 134. Memory 130 is connected to operating system interface 136 by operating system interface connection 138. Operating system interface 136 is connected to a connection 155 between I/O interface 150 and battery management unit 151 by connection 139. Battery management unit 151 is connected to battery 153 via battery connection 157. Battery 153 can be connected via bussing plate/identifier (ID) 199, which can serve as a bussing plate to conduct current and as an identifier to identify a battery pack vendor. Graphics interface 140 is connected to chipset 120 via a graphics interface 114, and provides a video display output 146 to a video display 142. Video display 142 is connected to a touch controller 144 via touch controller connection 148. An example of memory 130 includes random access memory (RAM) such as static RAM (SRAM), dynamic RAM (DRAM), non-volatile RAM (NV-RAM), or the like, read only memory (ROM), another type of memory, or a combination thereof.

Disk controller 160 is connected to chipset 120 via disk controller interface 116. I/O interface 150 is connected to chipset 120 via an I/O channel 159. An example of I/O channel 166 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 162 includes a USB interface, an IEEE 1194 (Firewire) interface, a proprietary interface, or a combination thereof. Alternatively, solid-state drive 184 can be disposed within information handling system 100.

I/O interface 150 is connected to a network interface 170 via connection 174. Network interface 170 connects to a network via network connection 172. I/O interface 150 includes a peripheral interface 152 that connects the I/O interface to an add-on resource 154, to a security resource 158, and to platform fuses 156. Add-on resource 154 can connect to, for example, external storage 190 via external connection 192. Peripheral interface 152 can be the same type of interface as I/O channel 159, or can be a different type of interface. As such, I/O interface 170 extends the capacity of I/O channel 159 when peripheral interface 152 and the I/O channel are of the same type, and the I/O interface translates information from a format suitable to the I/O channel to a format suitable to the peripheral channel 152 when they are of a different type. Add-on resource 154 can include a data storage system, an additional graphics interface, a network interface card (NIC), a sound/video processing card, another add-on resource, or a combination thereof. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 110, in another suitable location, or a combination thereof. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channel 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Figure 2:
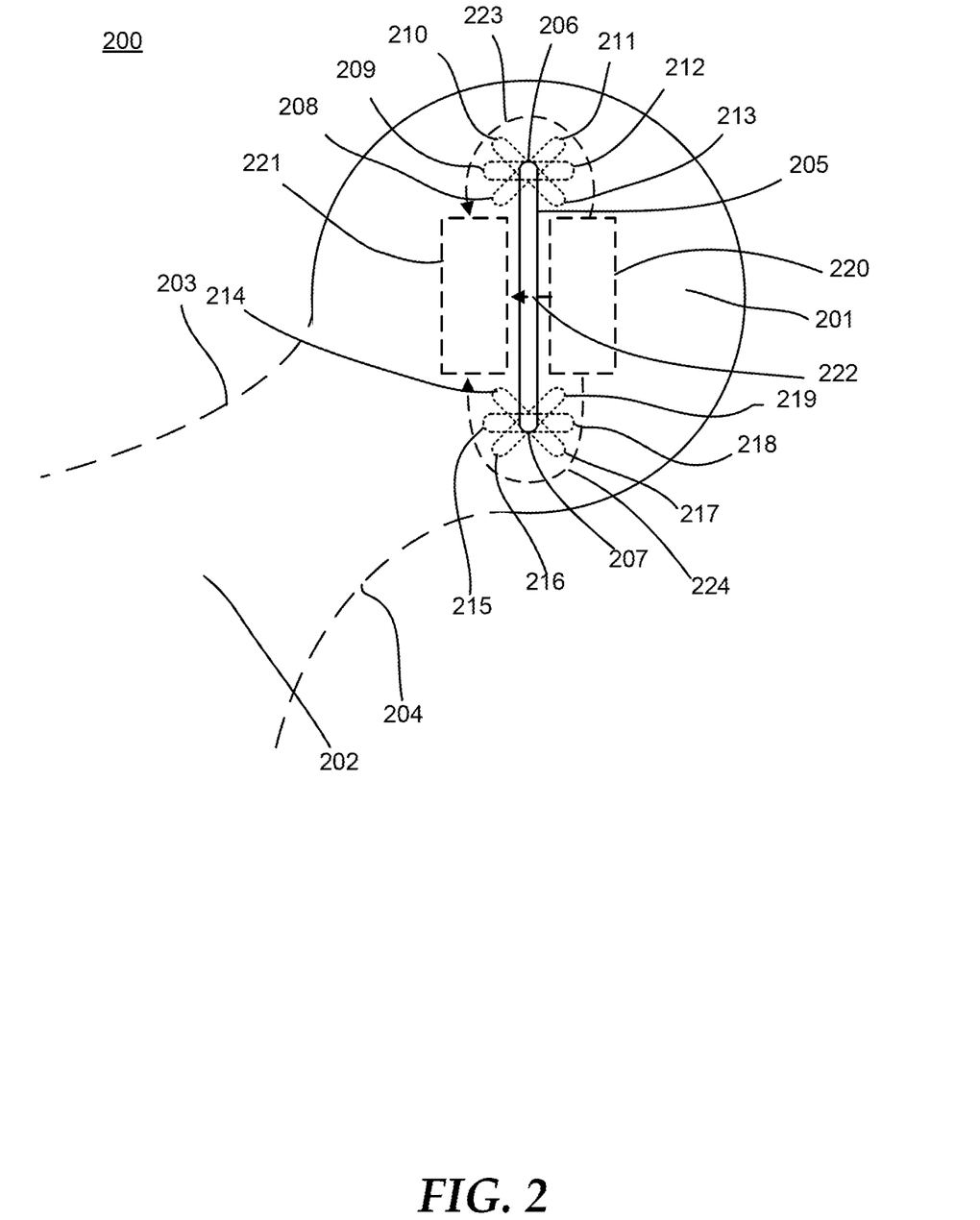
FIG. 2 is a plan view diagram of a battery pack bussing plate according to an embodiment of the present disclosure.

FIG. 2 shows a battery pack bussing plate 200 having a battery terminal contact area 201 and a battery lead 202. The geometry of battery lead 202, as shown by edges 203 and 204, may vary, depending on the intended connection to other battery cells, fuses, wires, connector, or the like. Battery pack bussing plate 201 is shown as being circular and may be of a size typically slightly smaller than a diameter of a cylindrical battery cell to which it is configured to be welded. Other sizes and shapes of battery pack bussing plate 201 may be used, for example, for use with rectangular prismatic battery cells or battery cells of other shapes.

Battery pack bussing plate 200 defines a current director 205. Current director 205 is in the form of an elongated slot in battery pack bussing plate 201 extending from first terminus 206 to second terminus 207. Current director 205 is disposed transversely relative to a direct path 222 between first electrode contact area 220 and second electrode contact area 221.

Battery pack bussing plate 200 is configured to be welded to a battery terminal of a battery cell of the battery pack within which it is used. The battery terminal may, for example, be at an end of the battery cell, such as a circular end of a cylindrical battery cell. A resistance welding technique may be used to weld the battery pack bussing plate 200 to the battery terminal. For a resistance welding technique, welding equipment passes current through the metal to be welded together at a sufficient current to momentarily heat the metal above its melting point, liquefying the metal, and allowing the metal to return to its solid state (e.g., freeze) as a unitized piece of metal.

Current follows the path of least resistance between two points. Accordingly, current would tend to flow from first electrode contact area 220, within which a first resistance welder electrode is pressed against battery pack bussing plate 200 during the welding process, and second electrode contact area 221, within which a second resistance welder electrode is pressed against battery pack bussing plate 200 during the welding process, along direct path 222, which leads directly from first electrode contact area 220 to second electrode contact area 221. However, such a direct path would allow the current to flow almost exclusively in the battery pack bussing plate 200, largely avoiding the underlying battery terminal. Accordingly, battery pack bussing plate 200 would get warm, but the desired weldment at the interface between the battery terminal and the battery pack bussing plate would not be achieved.

To cause the current of the resistance welding equipment to flow through the battery terminal, as well as through battery pack bussing plate 200, current director 205 is provided. Current director 205 can be implemented in the form of an elongated slot in the battery pack bussing plate. By removing metal, for example, by punching out the elongated slot, to leave a nonconductive gap through which current cannot flow, current that would tend to flow through only battery pack bussing plate 200 is diverted through longer paths of higher resistance, such as longer paths 223 and 224. However, as current follows the path of least resistance, the current can instead follow a lower resistance path from a first welder electrode to first electrode contact area 220, through the interface of battery pack bussing plate 200 with the underlying battery terminal area that underlies the first electrode contact area 220, across the underlying battery terminal to span the gap of current director 205, then through the interface of battery pack bussing plate 200 with the underlying battery terminal area that underlies the second electrode contact area 221, then from the second electrode contact area 221 to a second welder electrode. Thus, two weldments can be reliably formed between the battery terminal and battery pack bussing plate 200—one underlying first electrode contact area 220 and the other underlying second electrode contact area 221.

Consumers tend to prefer battery packs with higher capacities, which can allow longer use of information handling systems between charging. Battery chemistries based on elements, such as lithium, that can provide high electrochemical potentials are used to provide high capacity battery cells from which to manufacture high capacity battery packs. By virtue of the large amount of energy that can be stored in such high capacity battery cells, failures of such battery cells can release a large amount of energy in the form of heat. While much research and engineering has been devoted to battery safety, and modern battery cells are very reliable and thermal failure event very rare, it is useful to be able to obtain as much information from any battery pack that has experienced thermal failure, as such information can further the research and engineering.

However, a thermal failure event can result in loss of information. For example, identification information printed on a plastic label applied to a battery pack or on a plastic part of a battery pack can be melted during the thermal failure event and the information lost. However, even information embodied in materials besides plastic materials can be lost. For example, aluminum melts at 660 degrees C., and lithium-based battery thermal failure events can result in temperatures of approximately that temperature, so even aluminum parts of a battery pack may not survive a thermal failure event.

Other materials with higher melting points are used in the manufacture of battery packs, but typically only for current carrying components, which have, heretofore, typically not been used for identification purposes. As examples, copper has a melting point of 1083 degrees C. and nickel has a melting point of 1448 degrees C., so copper based or nickel based components of battery packs are more likely to survive intact a thermal failure event than components that would melt or decompose at lower temperatures.

By adding at least one extension to current director 205, the at least one extension can serve as a data storage element to store data that can represent an identity of a vendor of a battery pack. The battery pack bussing plate 200 in which current director 205 and its at least one extension are defined can be made of a copper or nickel based material that works effectively to conduct battery current within the battery pack and can be expected to tolerate a thermal failure event without lost of the identification information through deformation of the extension to current director 205. Moreover, the at least one extension can serve to increase the bypass path electrical resistance of paths 223 and 224 by making such paths circumnavigate the at least one extension instead of just first terminus 206 and second terminus 207 of current director 205.

Examples of the at least one extension to current director 205 include at least one of extensions 208, 209, 210, 211, 212, 213, 214, 215, 216, 217, 218, and 219. Each of extensions 208, 209, 210, 211, 212, 213, 214, 215, 216, 217, 218, and 219 can function as a one bit cell of read only memory that, unlike typical semiconductor memory devices, can tolerate high temperatures of thermal failure events of battery packs. For example, an extension can represent, say, a bit value of one, and the absence of an extension can represent, say, an opposite bit value of zero. Alternatively, the bit value may be zero and the opposite bit value may be one. A bit pattern represented by the at least one extension can denote an identifier value that can identify the vendor from whom the battery pack was procured. While the twelve bits represented by possible extensions 208, 209, 210, 211, 212, 213, 214, 215, 216, 217, 218, and 219 are capable of representing $2^{12}-1=4095$ possible values, the four bits represented by possible extensions 209, 212, 215, and 218 are capable of representing $2^4-1=15$ possible values, which are more readily illustrated, as shown in FIGS. 3-17 and described below.

Figure 3:
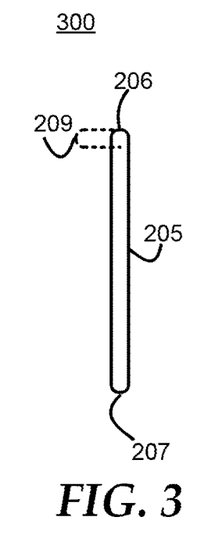
FIG. 3 is a plan view diagram of a current director for a battery pack bussing plate according to an embodiment of the present disclosure.
Figure 4:
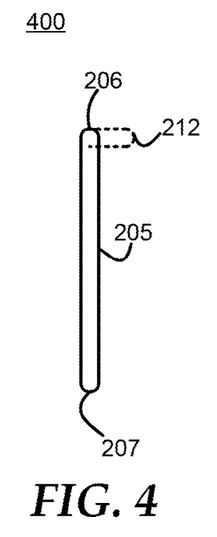
FIG. 4 is a plan view diagram of a current director for a battery pack bussing plate according to an embodiment of the present disclosure.
Figure 5:
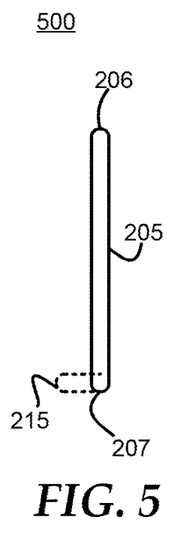
FIG. 5 is a plan view diagram of a current director for a battery pack bussing plate according to an embodiment of the present disclosure.

FIG. 3 is a plan view diagram of a current director for a battery pack bussing plate according to an embodiment of the present disclosure. An extended current director 300 is defined by current director 205 extended by extension 209 extending leftward from first terminus 206 of current director 205. The extended current director forms a distinctive "7" shape that can serve as an identifier value. FIG. 4 is a plan view diagram of a current director for a battery pack bussing plate according to an embodiment of the present disclosure. An extended current director 400 is defined by current director 205 extended by extension 212 extending rightward from first terminus 206 of current director 205. The extended current director forms a distinctive inverted "T" shape that can serve as an identifier value. FIG. 5 is a plan view diagram of a current director for a battery pack bussing plate according to an embodiment of the present disclosure. An extended current director 500 is defined by current director 205 extended by extension 215 extending leftward from second terminus 207 of current director 205. The extended current director forms a distinctive "J" shape that can serve as an identifier value.

Figure 6:
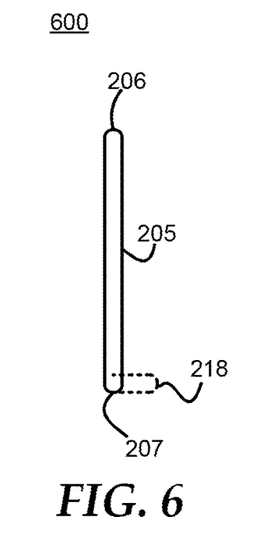
FIG. 6 is a plan view diagram of a current director for a battery pack bussing plate according to an embodiment of the present disclosure.
Figure 7:
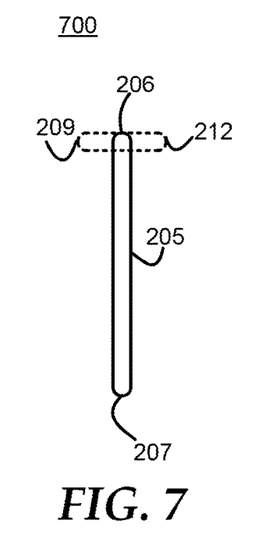
FIG. 7 is a plan view diagram of a current director for a battery pack bussing plate according to an embodiment of the present disclosure.
Figure 8:
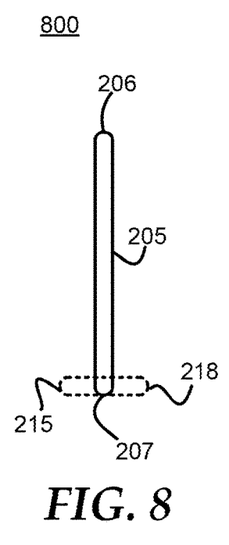
FIG. 8 is a plan view diagram of a current director for a battery pack bussing plate according to an embodiment of the present disclosure.

FIG. 6 is a plan view diagram of a current director for a battery pack bussing plate according to an embodiment of the present disclosure. An extended current director 600 is defined by current director 205 extended by extension 218 extending rightward from second terminus 207 of current director 205. The extended current director forms a distinctive "L" shape that can serve as an identifier value. FIG. 7 is a plan view diagram of a current director for a battery pack bussing plate according to an embodiment of the present disclosure. An extended current director 700 is defined by current director 205 extended by extension 209 extending leftward from first terminus 206 of current director 205 and by extension 212 extending rightward from first terminus 206 of current director 205. The extended current director forms a distinctive "T" shape that can serve as an identifier value. FIG. 8 is a plan view diagram of a current director for a battery pack bussing plate according to an embodiment of the present disclosure. An extended current director 800 is defined by current director 205 extended by extension 215 extending leftward from second terminus 207 of current director 205 and by extension 218 extending rightward from second terminus 207 of current director 205. The extended current director forms a distinctive inverted "T" shape that can serve as an identifier value.

Figure 9:
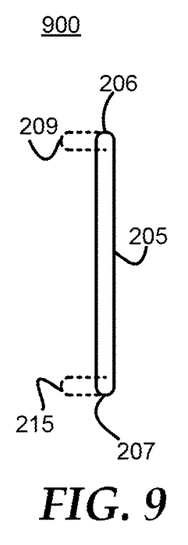
FIG. 9 is a plan view diagram of a current director for a battery pack bussing plate according to an embodiment of the present disclosure.
Figure 10:
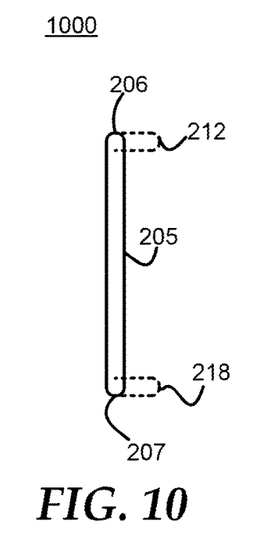
FIG. 10 is a plan view diagram of a current director for a battery pack bussing plate according to an embodiment of the present disclosure.

FIG. 9 is a plan view diagram of a current director for a battery pack bussing plate according to an embodiment of the present disclosure. An extended current director 900 is defined by current director 205 extended by extension 209 extending leftward from first terminus 206 of current director 205 and by extension 215 extending leftward from second terminus 207 of current director 205. The extended current director forms a distinctive reversed "C" shape that can serve as an identifier value. FIG. 10 is a plan view diagram of a current director for a battery pack bussing plate according to an embodiment of the present disclosure. An extended current director 1000 is defined by current director 205 extended by extension 212 extending rightward from first terminus 206 of current director 205 and by extension 218 extending rightward from second terminus 207 of current director 205. The extended current director forms a distinctive "C" shape that can serve as an identifier value.

Figure 11:
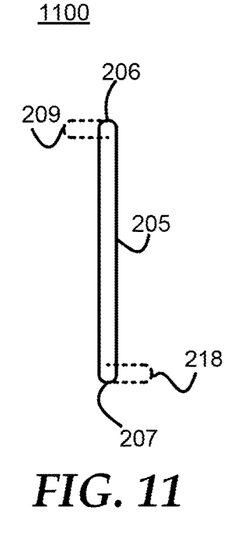
FIG. 11 is a plan view diagram of a current director for a battery pack bussing plate according to an embodiment of the present disclosure.
Figure 12:
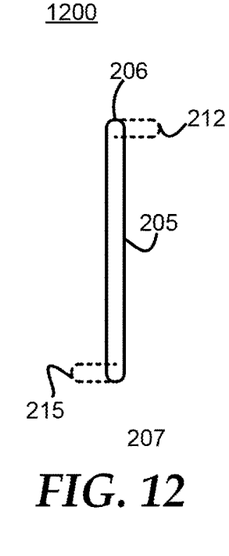
FIG. 12 is a plan view diagram of a current director for a battery pack bussing plate according to an embodiment of the present disclosure.

FIG. 11 is a plan view diagram of a current director for a battery pack bussing plate according to an embodiment of the present disclosure. An extended current director 1100 is defined by current director 205 extended by extension 209 extending leftward from first terminus 206 of current director 205 and by extension 218 extending rightward from second terminus 207 of current director 205. The extended current director forms a distinctive "Z" shape that can serve as an identifier value. FIG. 12 is a plan view diagram of a current director for a battery pack bussing plate according to an embodiment of the present disclosure. An extended current director 1200 is defined by current director 205 extended by extension 212 extending rightward from first terminus 206 of current director 205 and by extension 215 extending leftward from second terminus 207 of current director 205. The extended current director forms a distinctive "S" shape that can serve as an identifier value.

Figure 13:
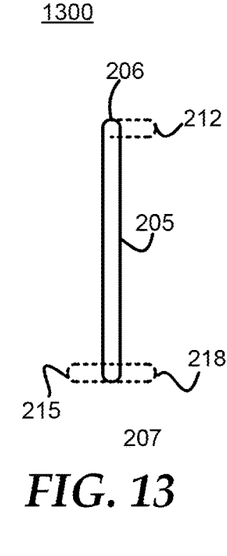
FIG. 13 is a plan view diagram of a current director for a battery pack bussing plate according to an embodiment of the present disclosure.
Figure 14:
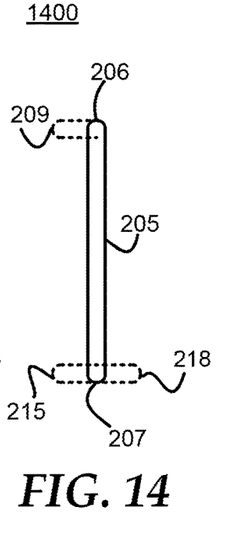
FIG. 14 is a plan view diagram of a current director for a battery pack bussing plate according to an embodiment of the present disclosure.

FIG. 13 is a plan view diagram of a current director for a battery pack bussing plate according to an embodiment of the present disclosure. An extended current director 1300 is defined by current director 205 extended by extension 212 extending rightward from first terminus 206 of current director 205 and by extension 215 extending leftward and extension 218 extending rightward from second terminus 207 of current director 205. The extended current director forms a distinctive reversed "1" shape that can serve as an identifier value. FIG. 14 is a plan view diagram of a current director for a battery pack bussing plate according to an embodiment of the present disclosure. An extended current director 1400 is defined by current director 205 extended by extension 209 extending leftward from first terminus 206 of current director 205 and by extension 215 extending leftward and extension 218 extending rightward from second terminus 207 of current director 205. The extended current director forms a distinctive "1" shape that can serve as an identifier value.

Figure 15:
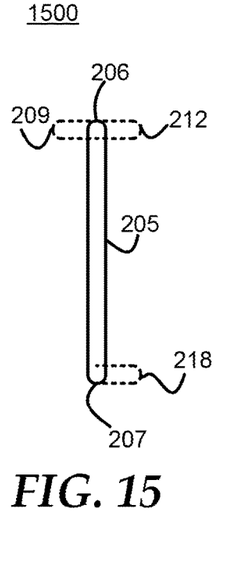
FIG. 15 is a plan view diagram of a current director for a battery pack bussing plate according to an embodiment of the present disclosure.
Figure 16:
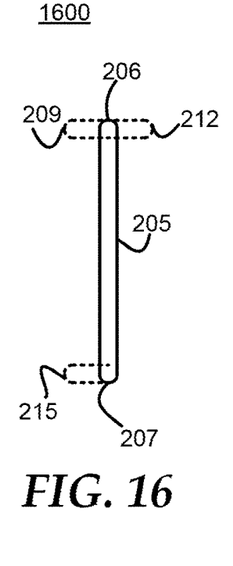
FIG. 16 is a plan view diagram of a current director for a battery pack bussing plate according to an embodiment of the present disclosure.
Figure 17:
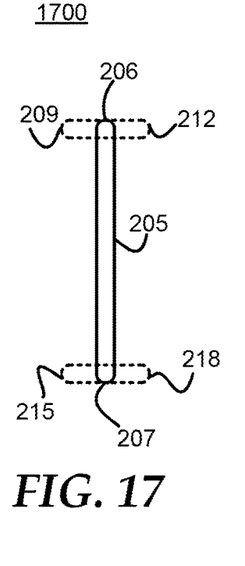
FIG. 17 is a plan view diagram of a current director for a battery pack bussing plate according to an embodiment of the present disclosure.

FIG. 15 is a plan view diagram of a current director for a battery pack bussing plate according to an embodiment of the present disclosure. An extended current director 1500 is defined by current director 205 extended by extension 209 extending leftward and extension 212 extending rightward from first terminus 206 of current director 205 and by extension 218 extending rightward from second terminus 207 of current director 205. The extended current director forms a distinctive inverted and reversed "1" shape that can serve as an identifier value. FIG. 16 is a plan view diagram of a current director for a battery pack bussing plate according to an embodiment of the present disclosure. An extended current director 1600 is defined by current director 205 extended by extension 209 extending leftward and extension 212 extending rightward from first terminus 206 of current director 205 and by extension 215 extending leftward from second terminus 207 of current director 205. The extended current director forms a distinctive inverted "1" shape that can serve as an identifier value. FIG. 17 is a plan view diagram of a current director for a battery pack bussing plate according to an embodiment of the present disclosure. An extended current director 1700 is defined by current director 205 extended by extension 209 extending leftward and extension 212 extending rightward from first terminus 206 of current director 205 and by extension 215 extending leftward and extension 218 extending rightward from second terminus 207 of current director 205. The extended current director forms a distinctive inverted "I" shape that can serve as an identifier value.

Figure 18:
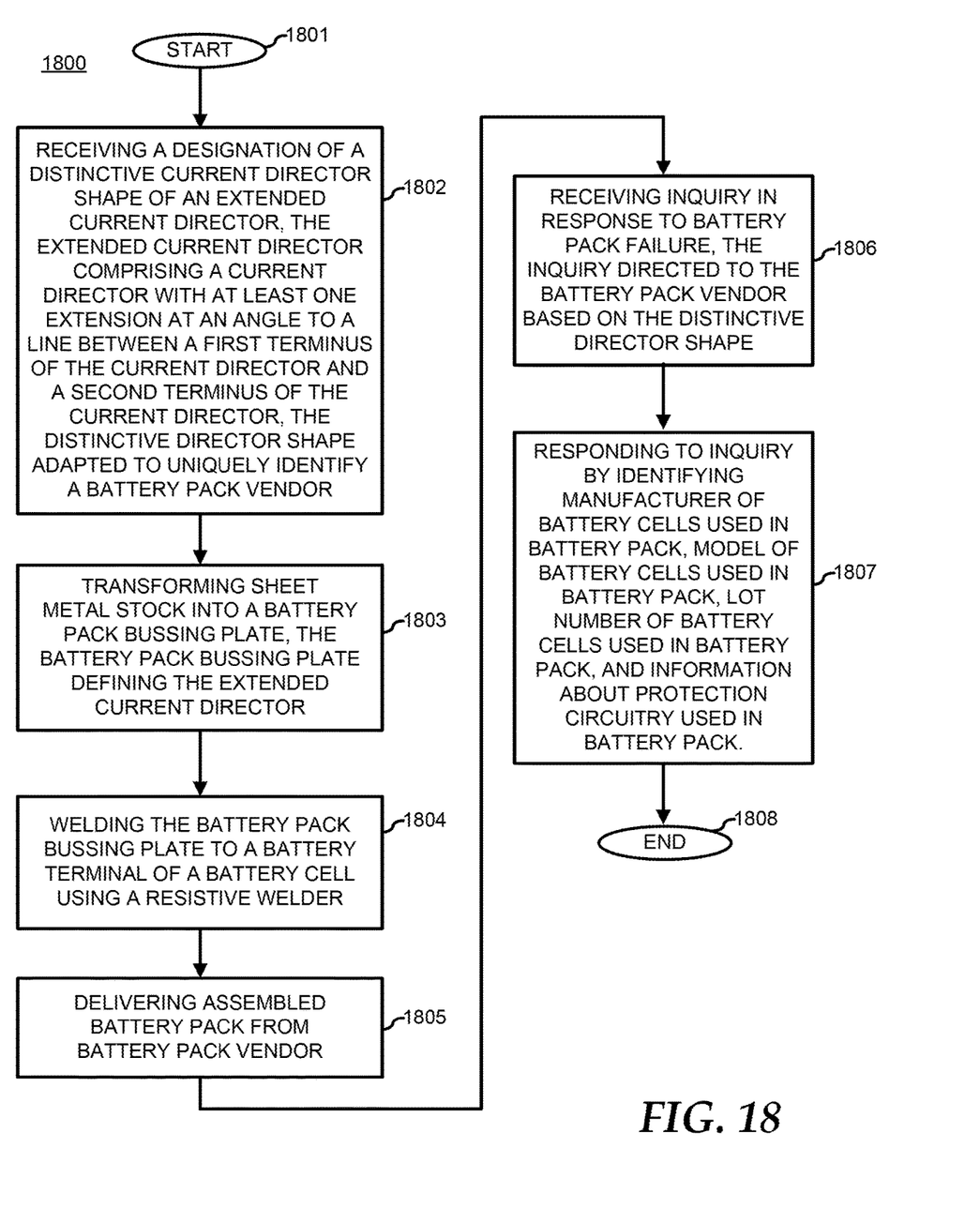
FIG. 18 is a flow diagram illustrating a method according to an embodiment of the present disclosure.

FIG. 18 is a flow diagram illustrating a method according to an embodiment of the present disclosure. Method 1800 begins in block 1801. From block 1801, method 1800 continues to block 1802. At block 1802, a designation of a distinctive current director shape of an extended current director is received, the extended current director comprising a current director with at least one extension at an angle to a line between a first terminus of the current director and a second terminus of the current director, the distinctive director shape adapted to uniquely identify a battery pack vendor. From block 1802, method 1800 continues at block 1803. At block 1803, sheet metal stock is physically transformed into a battery pack bussing plate, the battery pack bussing plate defining the extended current director. As an example, a battery pack bussing plate may be punched out of the sheet metal stock using a die having a sharp edge along the outline of the battery pack bussing plate and the outline of the extended current director. From block 1803, method 1800 continues to block 1804. At block 1804, the battery pack bussing plate is welded to a battery terminal of a battery cell using a resistive welder. From block 1804, method 1800 continues to block 1805. At block 1805, an assembled battery pack is delivered from the battery pack vendor. From block 1805, method 1800 continues to block 1806. At block 1806, an inquiry is received in response to a battery pack failure. The inquiry is directed to the battery pack vendor based on the distinctive director shape of the current director of the battery pack bussing plate surviving the battery pack failure event. From block 1806, method 1800 continues to block 1807. At block 1807, a response is made to the inquiry by identifying a manufacturer of the battery cells used in the battery pack, a model of the battery cells used in the battery pack, a lot number of the battery cells used in the battery pack, and information about protection circuitry using in the battery pack. From block 1807, method 1800 continues to block 1808, where method 1800 ends.

In accordance with at least one embodiment, the angle is between 45 and 135 degrees. In accordance with at least one embodiment, the angle is between 85 and 95 degrees. In accordance with at least one embodiment, the sheet metal stock comprises a chemical element selected from a group consisting of copper and nickel. In accordance with at least one embodiment, the sheet metal stock has a melting point in excess of 1000 degrees Celsius. In accordance with at least one embodiment, the at least one extension increases the bypass path electrical resistance of the battery pack bussing plate. In accordance with at least one embodiment, the distinctive current director shape differs from a different distinctive current director shape adapted to uniquely identify a different battery pack vendor.

Figure 19:
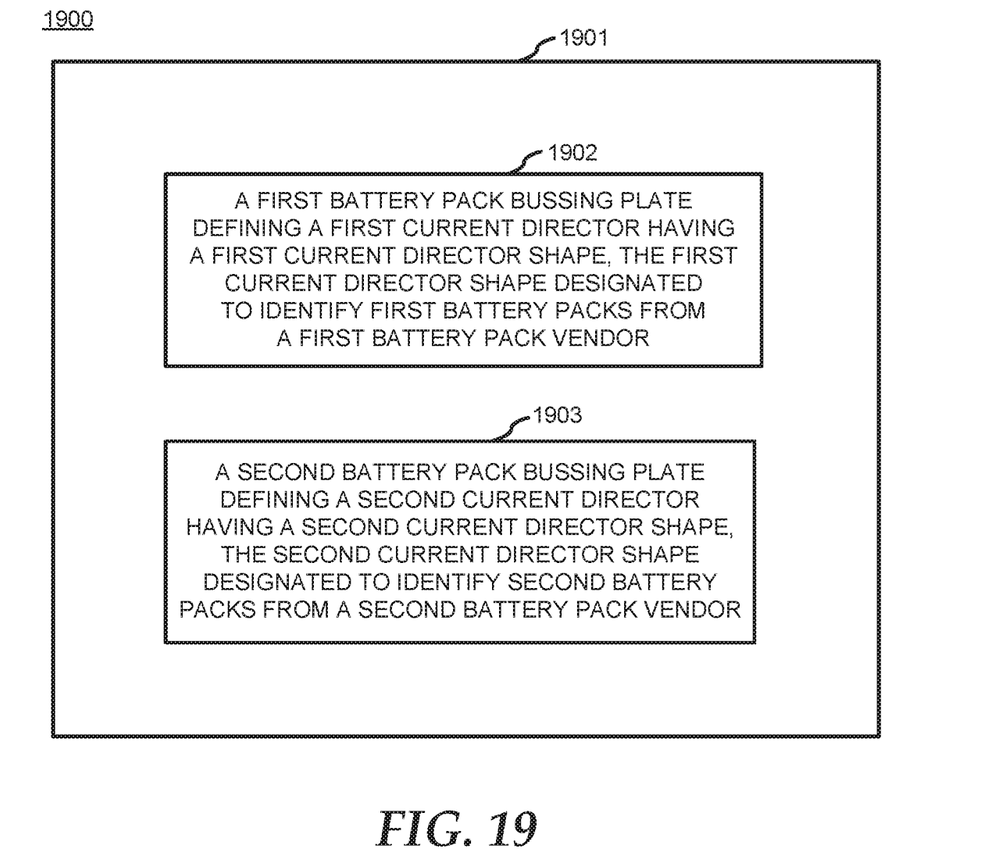
FIG. 19 is a block diagram illustrating a system according to an embodiment of the present disclosure.

FIG. 19 is a block diagram illustrating a system according to an embodiment of the present disclosure. System 1900 provides battery vendor identification capable of surviving a thermal failure event. System 1900 comprises a first battery pack bussing plate 1902 defining a first current director having a first current director shape, the first current director shape designated to identify first battery packs from a first battery pack vendor, and a second battery pack 1903 bussing plate defining a second current director having a second current director shape, the second current director shape designated to identify second battery packs from a second battery pack vendor.

Figure 20:
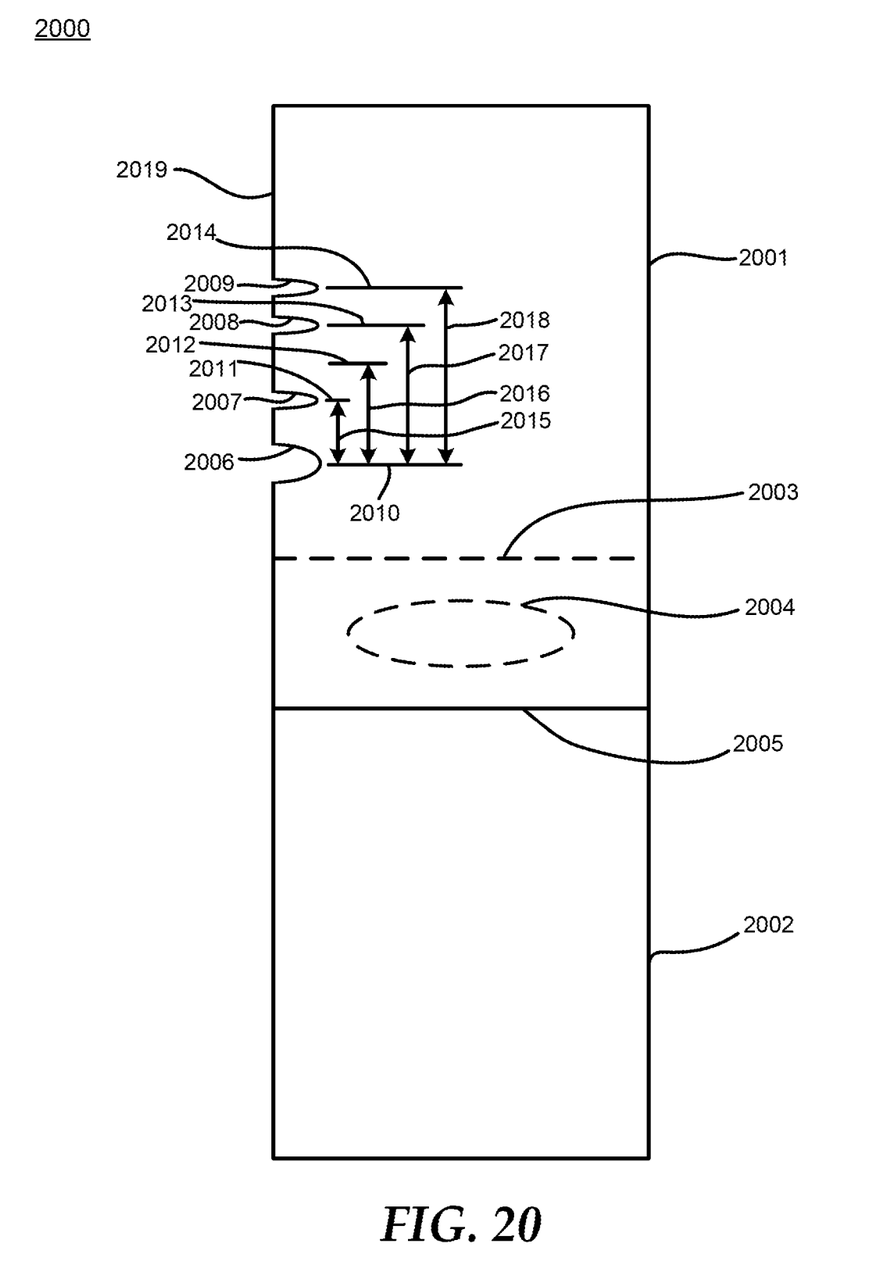
FIG. 20 is a plan view diagram of a battery pack bussing plate according to an embodiment of the present disclosure.

FIG. 20 is a plan view diagram of a battery pack bussing plate according to an embodiment of the present disclosure. Battery pack bussing plate assembly 2000 comprises a battery pack bussing plate 2001, which may be connected, for example, via opposed electrode resistance welding, to a battery lead 2002 at weldment 2004. Battery lead 2002 may, for example, be a metallic tab connected to a battery terminal, for example, by parallel electrode resistive welding. The tab may be in the form of a solid metallic ribbon to serve as a conductor for the battery terminal, allowing welding of the tab to a battery back bussing plate 2001 to occur away from the battery cell on which the battery terminal is located, thereby keeping the heat of welding away from the battery cell. Battery pack bussing plate 2001 may overlap battery lead 2002, as shown by edge 2005 of battery pack bussing plate 2001 and edge 2003 of battery lead 2002, which is shown as a dashed line, as it may lie beneath battery pack bussing plate 2001, which may obscure view of it. Weldment 2004 can exist between battery pack bussing plate 2001 and battery lead 2002, although the effects of the heat of welding may be visibly apparent throughout the thickness of battery pack bussing plate 2001 in the vicinity of weldment 2004.

Battery pack bussing plate 2001 can define an identifier by defining notches relative to a datum. The identifier can identify, for example, a battery vendor among a plurality of battery vendors. As an example, a datum notch 2006 along edge 2019 of battery pack bussing plate 2001 can serve as a datum to provide registration of the physical locations of notches that convey information to be used as the identifier. Alternatively, other physically identifiable references of battery pack bussing plate 2001, such as edge 2003, can serve as a datum for reference of the physical locations of notches. While notches which have been removed from battery pack bussing plate 2001 can be observed by the absence of corresponding portions of battery pack bussing plate 2001, solid portions of battery pack bussing plate 2001 where notches could have been removed but were not can be observed by reference of their specified physical locations relative to the datum.

As an example, datum notch 2006 can define a datum line 2010 relative to which specified distances 2015, 2016, 2017, and 2018 can respectively define lines 2011, 2012, 2013, and 2014 along which corresponding notches may or may not be defined along an edge 2019 of battery pack bussing plate 2001, depending upon the value of the identifier to be represented by the notches and the lack of notches. In the example illustrated in FIG. 20, notch 2007 is shown as being defined in battery pack bussing plate 2001 along line 2011 at a distance 2015 from datum line 2010. No notch is shown as having been defined in battery pack bussing plate 2001 along line 2012 at a distance 2016 from datum line 2010, but rather battery pack bussing plate 2001 remains intact where a notch along line 2012 would otherwise be. Notch 2008 is shown as being defined in battery pack bussing plate 2001 along line 2013 at a distance 2017 from datum line 2010. Notch 2009 is shown as being defined in battery pack bussing plate 2001 along line 2014 at a distance 2018 from datum line 2010. The pattern of a notch, no notch, another notch, and yet another notch, as shown in the example of FIG. 20, can represent a particular identifier value, which may, for example, correspond to a particular battery vendor. Other patterns of notches and absences of notches, which may be thought of, conversely, as the absences or presences of portions of battery pack bussing plate 2001 at specified locations within battery pack bussing plate 2001, can be used to represent other identifier values. By forming notches in battery pack bussing plate 2001, which can be made of a material having a melting point higher than temperatures that may occur during a thermal failure event of a battery pack, battery pack bussing plate 2001 can continue to serve as an identifier of the battery pack vendor even after a thermal failure event of the battery pack in which it is located.

In accordance with at least one embodiment, the at least one extension extends at an angle to a line between a first terminus of the current director and a second terminus of the current director of between 45 and 135 degrees. In accordance with at least one embodiment, the at least one extension extends at an angle to a line between a first terminus of the current director and a second terminus of the current director of between 85 and 95 degrees. In accordance with at least one embodiment, the first battery pack bussing plate and the second battery pack bussing plate comprise a chemical element selected from a group consisting of copper and nickel. In accordance with at least one embodiment, the first battery pack bussing plate remains solid in excess of 1000 degrees Celsius and the second battery pack bussing plate remains solid in excess of 1000 degrees Celsius. In accordance with at least one embodiment, the first current director shape defines a first current director with a first extension at an second angle to a second line between a first terminus of the first current director and a second terminus of the first current detector and wherein the second current director shape defines a second current director with a second extension at a second angle to a second line between a third terminus of the second current director and a fourth terminus of the second current director. In accordance with at least one embodiment, the first extension increases a first bypass path electrical resistance of the first battery pack bussing plate and wherein the second extension increase a second bypass path electrical resistance of the second battery pack bussing plate.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. As one example, a length of an extension to a current director may be used to convey battery pack vendor identity information. As another example, a length of an extension to a current director may be used to convey battery pack vendor identity information. In the claims, means-plus-function clauses are intended to cover the structures described herein as performing the recited function and not only structural equivalents, but also equivalent structures.

What is claimed is:

1. A system for providing battery vendor identification capable of surviving a thermal failure event, comprising:
    a first battery pack bussing plate comprising a first data storage element, the first data storage element implemented by defining a first current director having a first current director shape, the first current director shape storing and representative of a first identifier value, the first identifier value designated to uniquely identify first battery packs from a first battery pack vendor; and
    a second battery pack bussing plate comprising a second data storage element, the second data storage element implemented by defining a second current director having a second current director shape, the second current director shape distinct from the first current director shape, the second current director shape storing and representative of a second identifier value, the second identifier value designated to uniquely identify second battery packs from a second battery pack vendor.

2. The system of claim 1, wherein the first current director shape defines at least one extension at a first terminus of the first current director, wherein the at least one extension extends at an angle to a line between the first terminus of the first current director and a second terminus of the first current director of between 45 and 135 degrees.

3. The system of claim 1, wherein the first current director shape defines at least one extension at a first terminus of the first current director, wherein the at least one extension extends at an angle to a line between the first terminus of the first current director and a second terminus of the first current director of between 85 and 95 degrees.

4. The system of claim 1, wherein the first battery pack bussing plate and the second battery pack bussing plate comprise a chemical element selected from a group consisting of copper and nickel.

5. The system of claim 1, wherein the first battery pack bussing plate remains solid in excess of 1000 degrees Celsius and the second battery pack bussing plate remains solid in excess of 1000 degrees Celsius.

6. The system of claim 1, wherein the first current director shape defines the first current director with a first extension at an second angle to a second line between a first terminus of the first current director and a second terminus of the first current detector and wherein the second current director shape defines the second current director with a second extension at a second angle to a second line between a third terminus of the second current director and a fourth terminus of the second current director.

7. The system of claim 6, wherein the first extension increases a first bypass path electrical resistance of the first battery pack bussing plate and wherein the second extension increases a second bypass path electrical resistance of the second battery pack bussing plate.

8. A battery pack bussing plate comprising:
    a conductive metal battery contact plate, the conductive metal battery contact plate comprising a data storage element, the data storage element implemented by defining a current director, the current director defining:
        an elongated slot extending from a first terminus to a second terminus; and
        at least one angular slot extending from the first terminus to a third terminus, wherein the angular slot meets the elongated slot at a first angle of between 45 and 135 degrees, the first angle selected from a plurality of angles, wherein a plurality of identifier values identifying a plurality of battery vendors are represented using the plurality of angles, the data storage element storing a first identifier value of the plurality of identifier values, the first identifier value representing a first battery vendor of the plurality of battery vendors, the current director configured to direct a spot welding current from a first resistance welder electrode contact area to a second resistance welder electrode contact area via a battery terminal of a battery cell.

9. The battery pack bussing plate of claim 8, wherein the first angle is between 85 and 95 degrees.

10. The battery pack bussing plate of claim 8, wherein the conductive metal battery contact plate comprises a chemical element selected from a group consisting of copper and nickel.

11. The battery pack bussing plate of claim 8, wherein the conductive metal battery contact plate has a melting point in excess of 1000 degrees Celsius.

* * * * *